(12) United States Patent
Votaw et al.

(10) Patent No.: US 9,729,536 B2
(45) Date of Patent: Aug. 8, 2017

(54) TIERED IDENTIFICATION FEDERATED AUTHENTICATION NETWORK SYSTEM

(71) Applicant: BANK OF AMERICA CORPORATION, Charlotte, NC (US)

(72) Inventors: Elizabeth S. Votaw, Potomac, MD (US); Alicia C. Jones-McFadden, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 96 days.

(21) Appl. No.: 14/928,392

(22) Filed: Oct. 30, 2015

(65) Prior Publication Data
US 2017/0126649 A1    May 4, 2017

(51) Int. Cl.
*H04L 29/06* (2006.01)
*G06F 17/30* (2006.01)

(52) U.S. Cl.
CPC .......... *H04L 63/08* (2013.01); *G06F 17/3053* (2013.01)

(58) Field of Classification Search
CPC ............................. H04L 63/08; G06F 17/3053
USPC .......................................................... 726/7
See application file for complete search history.

(56) References Cited

U.S. PATENT DOCUMENTS

| | | |
|---|---|---|
| 3,256,670 A | 6/1966 | Tersigni |
| 3,261,093 A | 7/1966 | Reswick |
| 3,295,812 A | 1/1967 | Scheider et al. |
| 3,295,898 A | 1/1967 | Finzel |
| 3,307,412 A | 3/1967 | Granqvist |
| 3,352,730 A | 11/1967 | Murch, Jr |
| 4,766,293 A | 8/1988 | Boston |
| 5,437,346 A | 8/1995 | Dumont |
| 5,438,186 A | 8/1995 | Nair et al. |

(Continued)

FOREIGN PATENT DOCUMENTS

| | | |
|---|---|---|
| EP | 1132876 | 9/2001 |
| WO | 2012058099 | 5/2012 |
| WO | 2013095486 | 6/2013 |

OTHER PUBLICATIONS

Final Office Action dated Aug. 27, 2015. U.S. Appl. No. 14/175,701.

(Continued)

*Primary Examiner* — Michael S McNally
(74) *Attorney, Agent, or Firm* — Michael A. Springs; Moore & Van Allen PLLC; Peter B. Stewart

(57) ABSTRACT

The present disclosure describes a tiered identification federated authentication network system. Embodiments compile one or more authentication credentials required for access to each of a plurality of applications to generate an authentication set for each application. The system may aggregate the plurality of authentication sets to form a tiered federated authentication module having multiple rankings, wherein each rank is associated with an authentication set; wherein a higher ranked authentication set corresponds to more stringent authentication credentials and a lower ranked authentication set corresponds to less stringent authentication credentials. The system may receive a request from a user for access to a current application, determine if the user has previously authenticated to a higher ranked application and, if so, enable access to the current application, without requiring the user to authenticate again.

18 Claims, 4 Drawing Sheets

(56) References Cited

U.S. PATENT DOCUMENTS

| | | | |
|---|---|---|---|
| 6,119,103 A | 9/2000 | Basch et al. |
| 6,254,000 B1 | 7/2001 | Degen et al. |
| 6,256,670 B1 | 7/2001 | Davies |
| 6,330,546 B1 | 12/2001 | Gopinathan et al. |
| 6,422,462 B1 | 7/2002 | Cohen |
| 6,516,056 B1 | 2/2003 | Justice et al. |
| 6,651,168 B1 | 11/2003 | Kao et al. |
| 6,658,393 B1 | 12/2003 | Basch et al. |
| 6,718,328 B1 | 4/2004 | Norris |
| 6,748,367 B1 | 6/2004 | Lee |
| 7,058,806 B2 | 6/2006 | Smeets et al. |
| 7,111,323 B1 | 9/2006 | Bhatia et al. |
| 7,136,835 B1 | 11/2006 | Flitcroft et al. |
| 7,177,838 B1 | 2/2007 | Ling |
| 7,231,202 B2 | 6/2007 | Natsuno |
| 7,239,226 B2 | 7/2007 | Berardi et al. |
| 7,328,189 B2 | 2/2008 | Ling |
| 7,337,144 B1 | 2/2008 | Blinn et al. |
| 7,373,515 B2 | 5/2008 | Owen et al. |
| 7,398,250 B2 | 7/2008 | Blinn et al. |
| 7,472,081 B1 | 12/2008 | Cason |
| 7,529,741 B2 | 5/2009 | Aravamudan et al. |
| 7,546,276 B2 | 6/2009 | Randle et al. |
| 7,596,530 B1 | 9/2009 | Glasberg |
| 7,599,287 B2 | 10/2009 | Testa et al. |
| 7,606,560 B2 | 10/2009 | Labrou et al. |
| 7,610,040 B2 | 10/2009 | Cantini et al. |
| 7,627,505 B2 | 12/2009 | Yoshida et al. |
| 7,657,489 B2 | 2/2010 | Stambaugh |
| 7,693,771 B1 | 4/2010 | Zimmerman et al. |
| 7,697,920 B1 | 4/2010 | McClain |
| 7,698,221 B2 | 4/2010 | Blinn et al. |
| 7,698,443 B2 | 4/2010 | Yaffe et al. |
| 7,716,180 B2 | 5/2010 | Vermeulen et al. |
| 7,738,382 B2 | 6/2010 | Le Faucheur et al. |
| 7,739,169 B2 | 6/2010 | Hammad |
| 7,742,967 B1 | 6/2010 | Keresman, III et al. |
| 7,783,281 B1 | 8/2010 | Cook et al. |
| 7,784,684 B2 | 8/2010 | Labrou et al. |
| 7,848,980 B2 | 12/2010 | Carlson |
| 7,930,264 B2 | 4/2011 | Geppert |
| 7,988,045 B2 | 8/2011 | Connell, II et al. |
| 7,992,779 B2 | 8/2011 | Phillips et al. |
| 8,012,219 B2 | 9/2011 | Mendez et al. |
| 8,032,932 B2 | 10/2011 | Speyer et al. |
| 8,156,335 B2 | 4/2012 | Lin |
| 8,165,945 B2 | 4/2012 | Collins et al. |
| 8,171,531 B2 | 5/2012 | Buer |
| 8,201,232 B2 | 6/2012 | Zhang et al. |
| 8,214,650 B2 | 7/2012 | Dickinson et al. |
| 8,244,210 B2 | 8/2012 | Ayanamcottil et al. |
| 8,249,805 B2 | 8/2012 | de Silva et al. |
| 8,261,093 B1 | 9/2012 | Dhesi et al. |
| 8,270,995 B1 | 9/2012 | Manroa et al. |
| 8,286,227 B1 | 10/2012 | Zheng |
| 8,295,812 B1 | 10/2012 | Jones |
| 8,295,898 B2 | 10/2012 | Ashfield et al. |
| 8,307,412 B2 | 11/2012 | Ozzie et al. |
| 8,307,413 B2 | 11/2012 | Smadja et al. |
| 8,327,428 B2 | 12/2012 | Bailey et al. |
| 8,327,429 B2 | 12/2012 | Speyer et al. |
| 8,332,272 B2 | 12/2012 | Fisher |
| 8,340,981 B1 | 12/2012 | Cave |
| 8,346,666 B2 | 1/2013 | Lindelsee et al. |
| 8,352,323 B2 | 1/2013 | Fisher |
| 8,352,730 B2 | 1/2013 | Giobbi |
| 8,369,833 B2 | 2/2013 | McClain |
| 8,380,177 B2 | 2/2013 | Laracey |
| 8,395,242 B2 | 3/2013 | Oliver et al. |
| 8,407,142 B1 | 3/2013 | Griggs |
| 8,412,626 B2 | 4/2013 | Hirson et al. |
| 8,423,466 B2 | 4/2013 | Lanc |
| 8,426,884 B2 | 4/2013 | Mizutani et al. |
| 8,442,915 B2 | 5/2013 | Takatori et al. |
| 8,483,194 B1 | 7/2013 | Wu et al. |
| 8,483,663 B1 | 7/2013 | Jones |
| 8,485,438 B2 | 7/2013 | Dollard |
| 8,498,940 B2 | 7/2013 | Pelegero et al. |
| 8,522,039 B2 | 8/2013 | Hyndman et al. |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,595,812 B2 | 11/2013 | Bomar et al. |
| 8,601,602 B1 | 12/2013 | Zheng |
| 8,602,602 B2 | 12/2013 | Anaokar et al. |
| 8,620,790 B2 | 12/2013 | Priebatsch |
| 8,637,133 B2 | 1/2014 | Vagliardo |
| 8,644,506 B2 | 2/2014 | Zellner |
| 8,650,757 B2 | 2/2014 | Rode |
| 8,660,358 B1 | 2/2014 | Bergboer et al. |
| 8,665,991 B2 | 3/2014 | Zhu et al. |
| 8,682,802 B1 | 3/2014 | Kannanari |
| 8,683,571 B2 | 3/2014 | Zapata et al. |
| 8,732,814 B2 * | 5/2014 | Radhakrishnan ... H04L 63/0807 709/227 |
| 8,744,968 B1 | 6/2014 | Grigg et al. |
| 8,768,838 B1 | 7/2014 | Hoffman |
| 8,769,270 B2 | 7/2014 | Orsini et al. |
| 8,788,333 B2 | 7/2014 | Alba et al. |
| 8,788,429 B2 | 7/2014 | Tieken |
| 8,789,162 B2 | 7/2014 | Radhakrishnan |
| 8,839,383 B2 | 9/2014 | Van Horn |
| 8,850,575 B1 | 9/2014 | Magi Shaashua et al. |
| 8,869,241 B2 | 10/2014 | Davis et al. |
| 8,869,305 B1 | 10/2014 | Huang |
| 8,881,306 B2 | 11/2014 | Feldman et al. |
| 8,930,271 B1 | 1/2015 | Ellis et al. |
| 8,943,574 B2 | 1/2015 | Bailey et al. |
| 8,973,102 B2 | 3/2015 | Jakobsson |
| 8,985,442 B1 | 3/2015 | Zhou et al. |
| 8,996,423 B2 | 3/2015 | Johnson et al. |
| 8,997,215 B2 * | 3/2015 | Guriappa Srinivas .. G06F 21/36 380/28 |
| 9,055,053 B2 | 6/2015 | Radhakrishnan et al. |
| 9,069,943 B2 | 6/2015 | Radhakrishnan et al. |
| 9,131,443 B2 | 9/2015 | Takaki |
| 9,146,345 B1 | 9/2015 | Dong et al. |
| 9,185,101 B2 | 11/2015 | Grigg et al. |
| 9,185,117 B2 | 11/2015 | Grigg et al. |
| 9,196,188 B2 | 11/2015 | Kimura |
| 9,200,154 B2 | 12/2015 | Teramoto et al. |
| 9,208,301 B2 | 12/2015 | Grigg et al. |
| 9,213,814 B2 | 12/2015 | Grigg et al. |
| 9,213,974 B2 | 12/2015 | Votaw et al. |
| 9,223,951 B2 | 12/2015 | Grigg et al. |
| 9,238,674 B2 | 1/2016 | Manoj et al. |
| 9,286,450 B2 | 3/2016 | Grigg et al. |
| 9,305,149 B2 | 4/2016 | Grigg et al. |
| 9,313,190 B2 | 4/2016 | Grigg et al. |
| 9,317,673 B2 | 4/2016 | Grigg et al. |
| 9,317,674 B2 | 4/2016 | Grigg et al. |
| 9,331,994 B2 | 5/2016 | Grigg et al. |
| 9,379,586 B2 | 6/2016 | Rahman et al. |
| 9,390,242 B2 | 7/2016 | Grigg et al. |
| 9,400,005 B2 | 7/2016 | Osborn et al. |
| 2001/0049711 A1 | 12/2001 | Nishihara |
| 2002/0077978 A1 | 6/2002 | O'Leary et al. |
| 2002/0111907 A1 | 8/2002 | Ling |
| 2002/0157029 A1 | 10/2002 | French et al. |
| 2002/0174073 A1 | 11/2002 | Nordman et al. |
| 2002/0186845 A1 | 12/2002 | Dutta et al. |
| 2003/0004866 A1 | 1/2003 | Huennekens et al. |
| 2003/0045328 A1 | 3/2003 | Natsuno |
| 2003/0061170 A1 | 3/2003 | Uzo |
| 2003/0065805 A1 | 4/2003 | Barnes, Jr. |
| 2003/0105714 A1 | 6/2003 | Alarcon-Luther et al. |
| 2003/0163708 A1 | 8/2003 | Tang |
| 2003/0163787 A1 | 8/2003 | Hay et al. |
| 2005/0119978 A1 | 6/2005 | Ates |
| 2005/0222961 A1 | 10/2005 | Staib et al. |
| 2006/0030333 A1 | 2/2006 | Ward et al. |

(56) References Cited

U.S. PATENT DOCUMENTS

| | | |
|---|---|---|
| 2006/0036868 A1 | 2/2006 | Cicchitto |
| 2006/0287004 A1 | 12/2006 | Fuqua |
| 2007/0055594 A1 | 3/2007 | Rivest et al. |
| 2007/0094152 A1 | 4/2007 | Bauman et al. |
| 2007/0100773 A1 | 5/2007 | Wallach |
| 2007/0113275 A1 | 5/2007 | Khanna et al. |
| 2007/0156842 A1 | 7/2007 | Vermeulen et al. |
| 2007/0168677 A1 | 7/2007 | Kudo et al. |
| 2007/0194884 A1 | 8/2007 | Didier et al. |
| 2007/0219984 A1 | 9/2007 | Aravamudan et al. |
| 2007/0223706 A1 | 9/2007 | Gantman et al. |
| 2007/0250920 A1 | 10/2007 | Lindsay |
| 2007/0277232 A1 | 11/2007 | Cates et al. |
| 2008/0109319 A1 | 5/2008 | Foss |
| 2008/0162338 A1 | 7/2008 | Samuels et al. |
| 2008/0162589 A1 | 7/2008 | Rodeheffer et al. |
| 2008/0167965 A1 | 7/2008 | Von Nothaus et al. |
| 2008/0189210 A1 | 8/2008 | Sawhney |
| 2008/0195499 A1 | 8/2008 | Meredith et al. |
| 2008/0293397 A1 | 11/2008 | Gajdos et al. |
| 2008/0319889 A1 | 12/2008 | Hammad |
| 2009/0006230 A1 | 1/2009 | Lyda et al. |
| 2009/0019534 A1 | 1/2009 | Bakshi et al. |
| 2009/0057396 A1 | 3/2009 | Barbour et al. |
| 2009/0076965 A1 | 3/2009 | Elson et al. |
| 2009/0100529 A1 | 4/2009 | Livnat et al. |
| 2009/0117883 A1 | 5/2009 | Coffing et al. |
| 2009/0119190 A1 | 5/2009 | Realini |
| 2009/0150286 A1 | 6/2009 | Barton |
| 2009/0164327 A1 | 6/2009 | Bishop et al. |
| 2009/0187492 A1 | 7/2009 | Hammad et al. |
| 2009/0199264 A1 | 8/2009 | Lang |
| 2009/0217346 A1 | 8/2009 | Manring et al. |
| 2009/0241178 A1 | 9/2009 | Burch et al. |
| 2009/0254975 A1 | 10/2009 | Turnbull et al. |
| 2010/0036741 A1 | 2/2010 | Cleven |
| 2010/0064345 A1 | 3/2010 | Bentley et al. |
| 2010/0100897 A1 | 4/2010 | Manuel-Devadoss |
| 2010/0122333 A1 | 5/2010 | Noe |
| 2010/0241571 A1 | 9/2010 | McDonald |
| 2010/0257099 A1 | 10/2010 | Bonalle et al. |
| 2010/0268645 A1 | 10/2010 | Martino et al. |
| 2010/0299262 A1 | 11/2010 | Handler |
| 2010/0312636 A1 | 12/2010 | Coulter et al. |
| 2010/0330958 A1 | 12/2010 | Corda et al. |
| 2011/0004921 A1 | 1/2011 | Homer et al. |
| 2011/0007921 A1 | 1/2011 | Stewart, Jr. et al. |
| 2011/0016534 A1 | 1/2011 | Jakobsson et al. |
| 2011/0022483 A1 | 1/2011 | Hammad |
| 2011/0099104 A1 | 4/2011 | Nybom |
| 2011/0137804 A1 | 6/2011 | Peterson |
| 2011/0142234 A1 | 6/2011 | Rogers |
| 2011/0159846 A1 | 6/2011 | Kemshall |
| 2011/0166992 A1 | 7/2011 | Dessert et al. |
| 2011/0167440 A1 | 7/2011 | Greenfield |
| 2011/0208601 A1 | 8/2011 | Ferguson et al. |
| 2011/0218907 A1 | 9/2011 | Dessert et al. |
| 2011/0251892 A1 | 10/2011 | Laracey |
| 2011/0270618 A1 | 11/2011 | Banerjee et al. |
| 2011/0277016 A1 | 11/2011 | Hockings et al. |
| 2011/0294066 A1 | 12/2011 | Hasegawa |
| 2011/0320296 A1 | 12/2011 | Edwards |
| 2012/0030047 A1 | 2/2012 | Fuentes et al. |
| 2012/0030109 A1 | 2/2012 | Dooley Maley et al. |
| 2012/0054057 A1 | 3/2012 | O'Connell et al. |
| 2012/0089514 A1 | 4/2012 | Kraemling et al. |
| 2012/0095916 A1 | 4/2012 | Dorsey et al. |
| 2012/0120880 A1 | 5/2012 | Lee et al. |
| 2012/0131828 A1 | 5/2012 | August et al. |
| 2012/0137340 A1 | 5/2012 | Jakobsson et al. |
| 2012/0144461 A1 | 6/2012 | Rathbun |
| 2012/0144468 A1 | 6/2012 | Pratt et al. |
| 2012/0158540 A1 | 6/2012 | Ganti et al. |
| 2012/0158586 A1 | 6/2012 | Ganti et al. |
| 2012/0160912 A1 | 6/2012 | Laracey |
| 2012/0166334 A1 | 6/2012 | Kimberg et al. |
| 2012/0171237 A1 | 7/2012 | Ching et al. |
| 2012/0173551 A1 | 7/2012 | Haddorp et al. |
| 2012/0174237 A1 | 7/2012 | Krzyzanowski |
| 2012/0179558 A1 | 7/2012 | Fischer |
| 2012/0197743 A1 | 8/2012 | Grigg et al. |
| 2012/0197794 A1 | 8/2012 | Grigg et al. |
| 2012/0203700 A1 | 8/2012 | Ornce et al. |
| 2012/0230539 A1 | 9/2012 | Calman et al. |
| 2012/0239576 A1 | 9/2012 | Rose et al. |
| 2012/0252365 A1 | 10/2012 | Lam |
| 2012/0254941 A1 | 10/2012 | Levien et al. |
| 2012/0254943 A1 | 10/2012 | Li |
| 2012/0260318 A1 | 10/2012 | Fromentoux et al. |
| 2012/0265585 A1 | 10/2012 | Muirbrook et al. |
| 2012/0271712 A1 | 10/2012 | Katzin et al. |
| 2012/0290482 A1 | 11/2012 | Atef et al. |
| 2012/0300938 A1 | 11/2012 | Kean et al. |
| 2012/0316963 A1 | 12/2012 | Moshfeghi |
| 2012/0316992 A1 | 12/2012 | Oborne |
| 2012/0317034 A1 | 12/2012 | Guha et al. |
| 2012/0323783 A1 | 12/2012 | Canetto |
| 2012/0330846 A1 | 12/2012 | Light et al. |
| 2013/0007874 A1 | 1/2013 | Purvis |
| 2013/0009547 A1 | 1/2013 | Shiu et al. |
| 2013/0013498 A1 | 1/2013 | Fisher et al. |
| 2013/0013499 A1 | 1/2013 | Kalgi |
| 2013/0018738 A1 | 1/2013 | Faires et al. |
| 2013/0024360 A1 | 1/2013 | Ballout |
| 2013/0030882 A1 | 1/2013 | Davis, III et al. |
| 2013/0030931 A1 | 1/2013 | Moshfeghi |
| 2013/0031003 A1 | 1/2013 | Dorsey et al. |
| 2013/0031004 A1 | 1/2013 | Dorsey et al. |
| 2013/0036048 A1 | 2/2013 | Campos et al. |
| 2013/0042314 A1 | 2/2013 | Kelley |
| 2013/0054336 A1 | 2/2013 | Graylin |
| 2013/0054470 A1 | 2/2013 | Campos et al. |
| 2013/0060689 A1 | 3/2013 | Oskolkov et al. |
| 2013/0060708 A1 | 3/2013 | Oskolkov et al. |
| 2013/0085927 A1 | 4/2013 | Scott |
| 2013/0097682 A1 | 4/2013 | Zeljkovic et al. |
| 2013/0097683 A1 | 4/2013 | Davis et al. |
| 2013/0097684 A1 | 4/2013 | Kim |
| 2013/0102283 A1 | 4/2013 | Lau et al. |
| 2013/0110658 A1 | 5/2013 | Lyman et al. |
| 2013/0111208 A1 | 5/2013 | Sabin et al. |
| 2013/0124346 A1 | 5/2013 | Baldwin et al. |
| 2013/0143621 A1 | 6/2013 | Kumaran |
| 2013/0159178 A1 | 6/2013 | Colon et al. |
| 2013/0166332 A1 | 6/2013 | Hammad |
| 2013/0167207 A1 | 6/2013 | Davis et al. |
| 2013/0173456 A1 | 7/2013 | Grigg et al. |
| 2013/0178233 A1 | 7/2013 | McCoy et al. |
| 2013/0179341 A1 | 7/2013 | Boudreau |
| 2013/0179954 A1 | 7/2013 | Bidare |
| 2013/0188485 A1 | 7/2013 | Midani et al. |
| 2013/0191227 A1 | 7/2013 | Pasa et al. |
| 2013/0198056 A1 | 8/2013 | Aldrey et al. |
| 2013/0204775 A1 | 8/2013 | Midkiff et al. |
| 2013/0204787 A1 | 8/2013 | Dubois |
| 2013/0212007 A1 | 8/2013 | Mattsson et al. |
| 2013/0212019 A1 | 8/2013 | Mattsson et al. |
| 2013/0219454 A1 | 8/2013 | Hewinson |
| 2013/0219473 A1 | 8/2013 | Schaefer |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0262315 A1 | 10/2013 | Hruska |
| 2013/0267204 A1 | 10/2013 | Schultz et al. |
| 2013/0268437 A1 | 10/2013 | Desai et al. |
| 2013/0290361 A1 | 10/2013 | Anderson et al. |
| 2013/0304651 A1 | 11/2013 | Smith |
| 2013/0318627 A1 | 11/2013 | Lundkvist et al. |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0025581 A1 | 1/2014 | Calman |
| 2014/0025958 A1 | 1/2014 | Calman |

(56) References Cited

U.S. PATENT DOCUMENTS

| | | |
|---|---|---|
| 2014/0058938 A1 | 2/2014 | McClung, III |
| 2014/0096215 A1 | 4/2014 | Hessler |
| 2014/0123244 A1* | 5/2014 | Resch ................ H04L 1/0045 726/4 |
| 2014/0129357 A1 | 5/2014 | Goodwin |
| 2014/0130127 A1 | 5/2014 | Toole et al. |
| 2014/0143145 A1 | 5/2014 | Kortina et al. |
| 2014/0143149 A1 | 5/2014 | Aissi |
| 2014/0172707 A1 | 6/2014 | Kuntagod et al. |
| 2014/0173704 A1 | 6/2014 | Adams et al. |
| 2014/0187148 A1 | 7/2014 | Taite et al. |
| 2014/0188719 A1 | 7/2014 | Poornachandran et al. |
| 2014/0195425 A1 | 7/2014 | Campos et al. |
| 2014/0208401 A1 | 7/2014 | Balakrishnan et al. |
| 2014/0214640 A1 | 7/2014 | Mallikarjunan et al. |
| 2014/0244493 A1 | 8/2014 | Kenyon et al. |
| 2014/0244503 A1 | 8/2014 | Sadlier |
| 2014/0245391 A1 | 8/2014 | Adenuga |
| 2014/0245411 A1* | 8/2014 | Meng ...................... H04L 63/08 726/7 |
| 2014/0250009 A1 | 9/2014 | Carlson |
| 2014/0279270 A1 | 9/2014 | Bertanzetti et al. |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0289821 A1 | 9/2014 | Wilson |
| 2014/0310764 A1 | 10/2014 | Tippett et al. |
| 2014/0315159 A1 | 10/2014 | Mukherjee et al. |
| 2014/0324690 A1 | 10/2014 | Allen et al. |
| 2014/0330721 A1 | 11/2014 | Wang |
| 2014/0337175 A1 | 11/2014 | Katzin et al. |
| 2014/0359709 A1 | 12/2014 | Nassar et al. |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032627 A1 | 1/2015 | Dill et al. |
| 2015/0039601 A1 | 2/2015 | Harrang et al. |
| 2015/0081557 A1 | 3/2015 | Kinfoil et al. |
| 2015/0081567 A1 | 3/2015 | Boyle et al. |
| 2015/0100495 A1 | 4/2015 | Salama et al. |
| 2015/0100788 A1 | 4/2015 | Chastain et al. |
| 2015/0120569 A1 | 4/2015 | Belshe et al. |
| 2015/0120572 A1 | 4/2015 | Slade |
| 2015/0161610 A1 | 6/2015 | Sahadevan et al. |
| 2015/0170149 A1 | 6/2015 | Sharma et al. |
| 2015/0171049 A1 | 6/2015 | Wasserman et al. |
| 2015/0206131 A1 | 7/2015 | Phillips et al. |
| 2015/0206137 A1 | 7/2015 | Mazarim Fernandes |
| 2015/0213474 A1 | 7/2015 | Howe |
| 2015/0220914 A1 | 8/2015 | Purves et al. |
| 2015/0227903 A1 | 8/2015 | Votaw et al. |
| 2015/0227924 A1 | 8/2015 | Grigg et al. |
| 2015/0227926 A1 | 8/2015 | Grigg et al. |
| 2015/0229625 A1 | 8/2015 | Grigg et al. |
| 2015/0254648 A1 | 9/2015 | Clements et al. |
| 2015/0254653 A1 | 9/2015 | Bondesen et al. |
| 2015/0254664 A1 | 9/2015 | Bondesen et al. |

OTHER PUBLICATIONS

Lane, "History of APIs"; APIEvangelist.com; Dec. 2012, 11 pages.

QThru.com. "QThru: use your mobile smartphone for self-checkout." http://www.qthru.com/. QThru.com © 2011. 6 pages. Retrieved Mar. 22, 2013.

RISNews.edgl.com. "Supermarket Retailer Rolls Out Self-Checkout Smartphone App." http://risnews.edgl.com/retail-news/Supermarket-Retailer-Rolls-Out-Self-Checkout-Smartphone-App81027 2 pages. Retrieved Mar. 9, 2013.

Simon, "Credit-Card Reward Programs: A Short History"; Creditcards.com, Nov. 2006, 4 pages.

Tode, Chantal. "Walmart speeds up checkout, lets shoppers scan items via iPhone." Published Sep. 5, 2012. http://WWW.mobilecommercedaily.com/walmart-speeds-up-checkout-lets-shoppers-scan-items-themselves-via-iphone. Mobile Commerce Daily. 4 pages. Retrieved Mar. 22, 2013.

Zimmerman, Ann. "Check Out the Future of Shopping: Shaving Time Off the Weekly Grocery Run to Keep Consumers in Stores and Spending." http://online.wsj.com/article/5B10001424052748703421204576329253050637400.html. 5 pages. Retrieved Mar. 22, 2013.

* cited by examiner

TIERED IDENTIFICATION FEDERATED AUTHENTICATION NETWORK SYSTEM

FIELD OF THE INVENTION

This disclosure generally relates to tiered identification federated authentication network systems.

BACKGROUND

People today often conduct their business or interact with all sorts of business or non-business entities via applications on their electronic or digital devices (e.g., mobile devices). Such interaction may present security issues. Therefore, many enterprises have taken precautionary measures to ensure the safety and protection of their users' information. This is typically accomplished by verifying a user's identity prior to enabling the user's access to any personal information via applications on their electronic or digital devices. However, individually authenticating and/or verifying their identity for multiple applications every time can be quite burdensome.

SUMMARY OF THE INVENTION

The following presents a summary of certain embodiments. This summary is not intended to be a comprehensive overview of all contemplated embodiments, and is not intended to identify key or critical elements of all embodiments nor delineate the scope of any or all embodiments. Its sole purpose is to present certain concepts and elements of one or more embodiments in a summary form as a prelude to the more detailed description that follows.

Embodiments herein described generally comprise systems, computer-implemented methods, and computer program products for tiered identification federated authentication of applications. The system embodiments may comprise a computer apparatus further comprising at least one processor and a memory and a software module, stored in the memory, comprising computer readable code executable by the processor, and configured to execute a plurality of steps.

In some embodiments, the system is configured to compile one or more authentication credentials required for access to each of a plurality of applications to generate an authentication set for each of the plurality applications, thereby generating a plurality of authentication sets for the plurality of applications, wherein more than one application may share a same authentication set. In some embodiments, the system may store the plurality of authentication sets in an authentication set database. Additionally, the system may aggregate the plurality of authentication sets to form a tiered federated authentication module having multiple authentication rankings, wherein each authentication ranking is associated with one of the authentication sets, and wherein authentication sets with a higher authentication ranking corresponds to more stringent authentication credentials and a lower ranked authentication set or application corresponds to less stringent authentication credentials.

Furthermore, the system may receive, from a user, a request for access to a first application, wherein the first application is one of the plurality of applications. The system may then identify, based on the authentication set database, a first authentication set associated with the first application and identify, based on the tiered federated authentication module, a first authentication rank associated with the first application set. In some embodiments, the system may determine that the user is currently authenticated to a second application, identify, based on the authentication set database, a second authentication set associated with the second application, and identify, based on the tiered federated authentication module, a second authentication rank associated with the second application set. Finally, the system may enable access to the first application for the user based on a comparison of the first authentication rank and the second authentication rank.

In some embodiments, the system may determine that the second authentication rank is higher than or equivalent to the first authentication rank and enable access to the first application for the user without requiring the user to provide authentication credentials for the first application. In some such embodiments, the system may determine that the user is currently not authenticated to a third application, identify, based on the authentication set database, a third authentication set associated with the third application, and identify, based on the tiered federated authentication module, a third authentication rank associated with the third application set. Additionally, the system may determine that the third authentication rank is lower than or equivalent to the first authentication rank and automatically enable access to the third application for the user.

In some embodiments, the system may determine that the second authentication rank is lower than the first authentication rank. In some such embodiments, the system may identify, based on the federated authentication, additional authentication credentials required for access to the first authentication rank, wherein the additional authentication credentials comprise fewer authentication credentials than original authentication credentials for the first authentication rank more authentication credentials than original authentication credentials for the second authentication rank. The system may then prompt the user to provide the additional authentication credentials for the first authentication rank, and receive, from the user, the additional authentication credentials for the first authentication rank. Once the system validates the additional authentication credentials for the first authentication rank, the system may enable access to the first application, based on validating the additional authentication credentials.

In some embodiments of the system, enabling access to the first application comprises generating a security token and providing the token to the user, wherein the security token enables access to one or more applications of the plurality of applications.

In some embodiments of the system, the authentication credentials comprises one or more of a username, a password, a passcode, a personal identification number (PIN), security questions, biometric data, device information associated with a mobile device of the user, the user account information, or any combination thereof.

To the accomplishment of the foregoing and related objectives, the embodiments of the present invention comprise the function and features hereinafter described. The following description and the referenced figures set forth a detailed description of the present invention, including certain illustrative examples of the one or more embodiments. The functions and features described herein are indicative, however, of but a few of the various ways in which the principles of the present invention may be implemented and used and, thus, this description is intended to include all such embodiments and their equivalents.

The features, functions, and advantages that have been discussed may be achieved independently in various embodiments of the invention or may be combined with yet other embodiments, further details of which can be seen with reference to the following description and drawings.

BRIEF DESCRIPTION OF THE DRAWINGS

Figure 1:
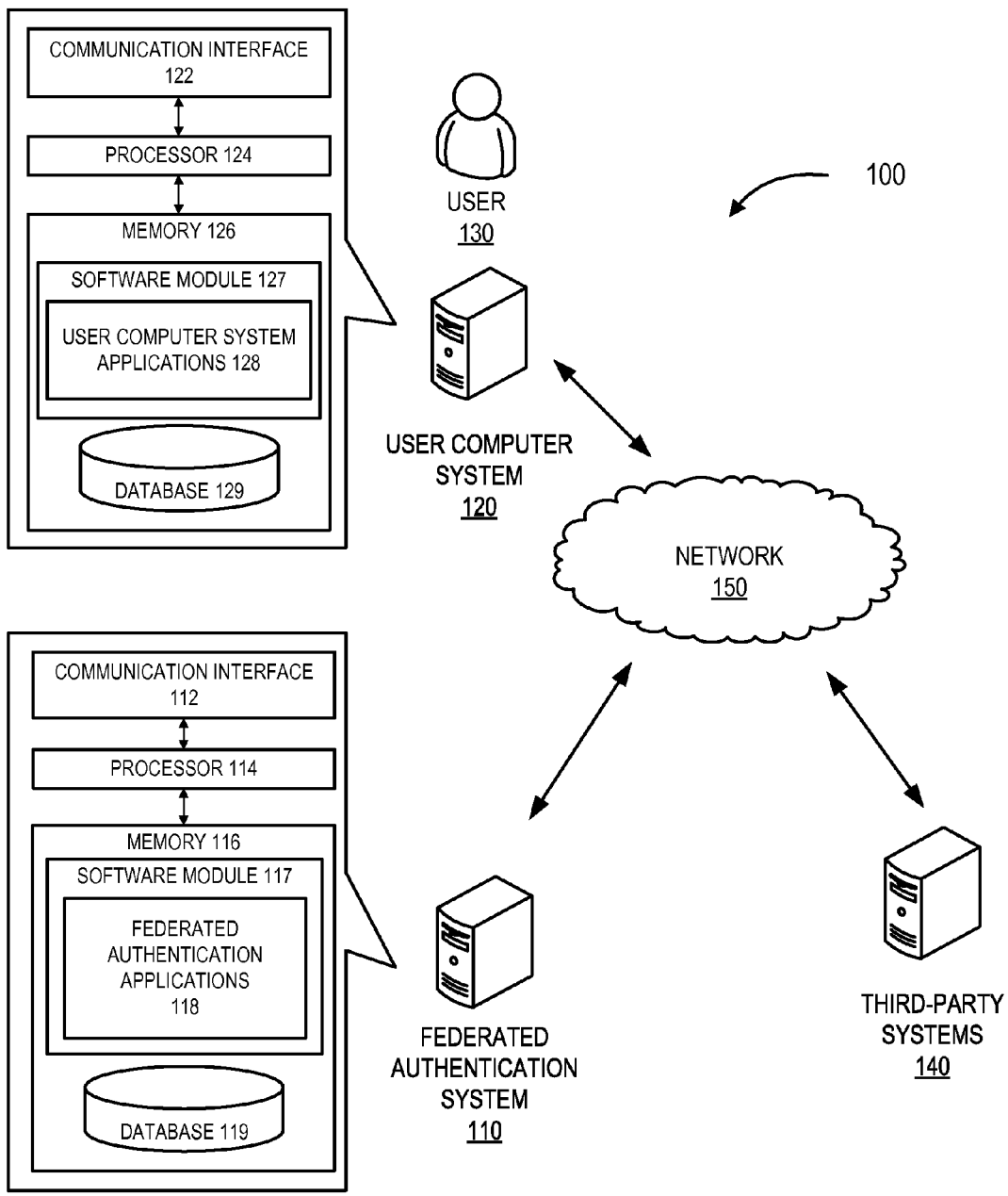
Figure 2:
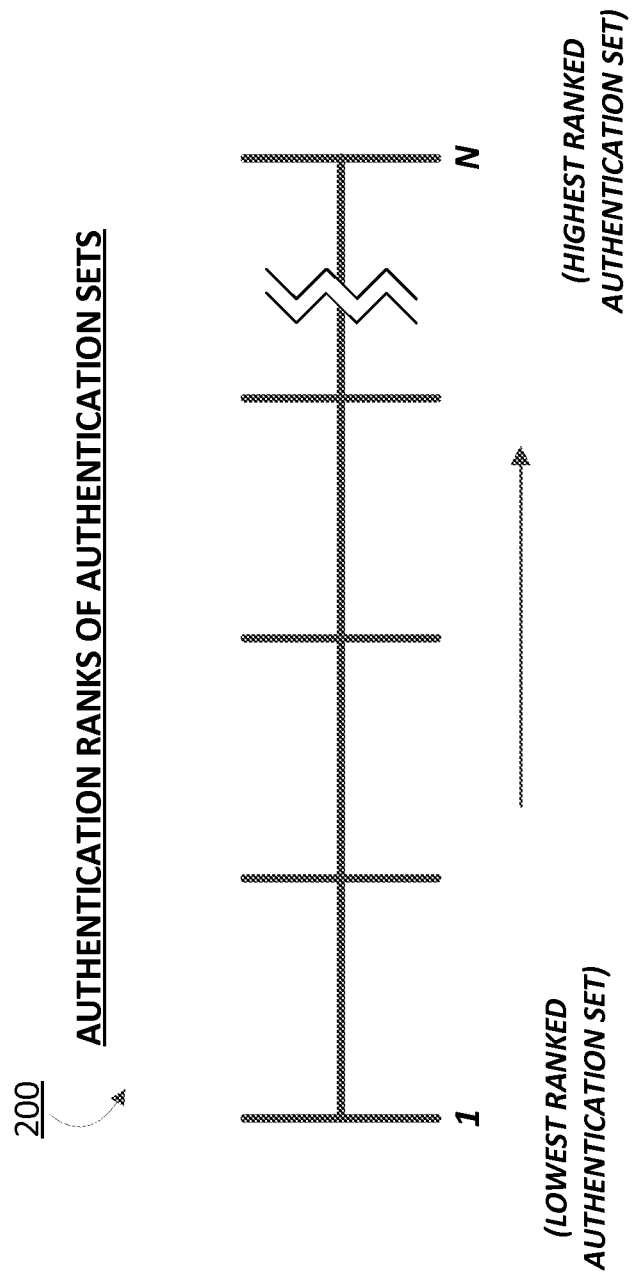
Figure 3:
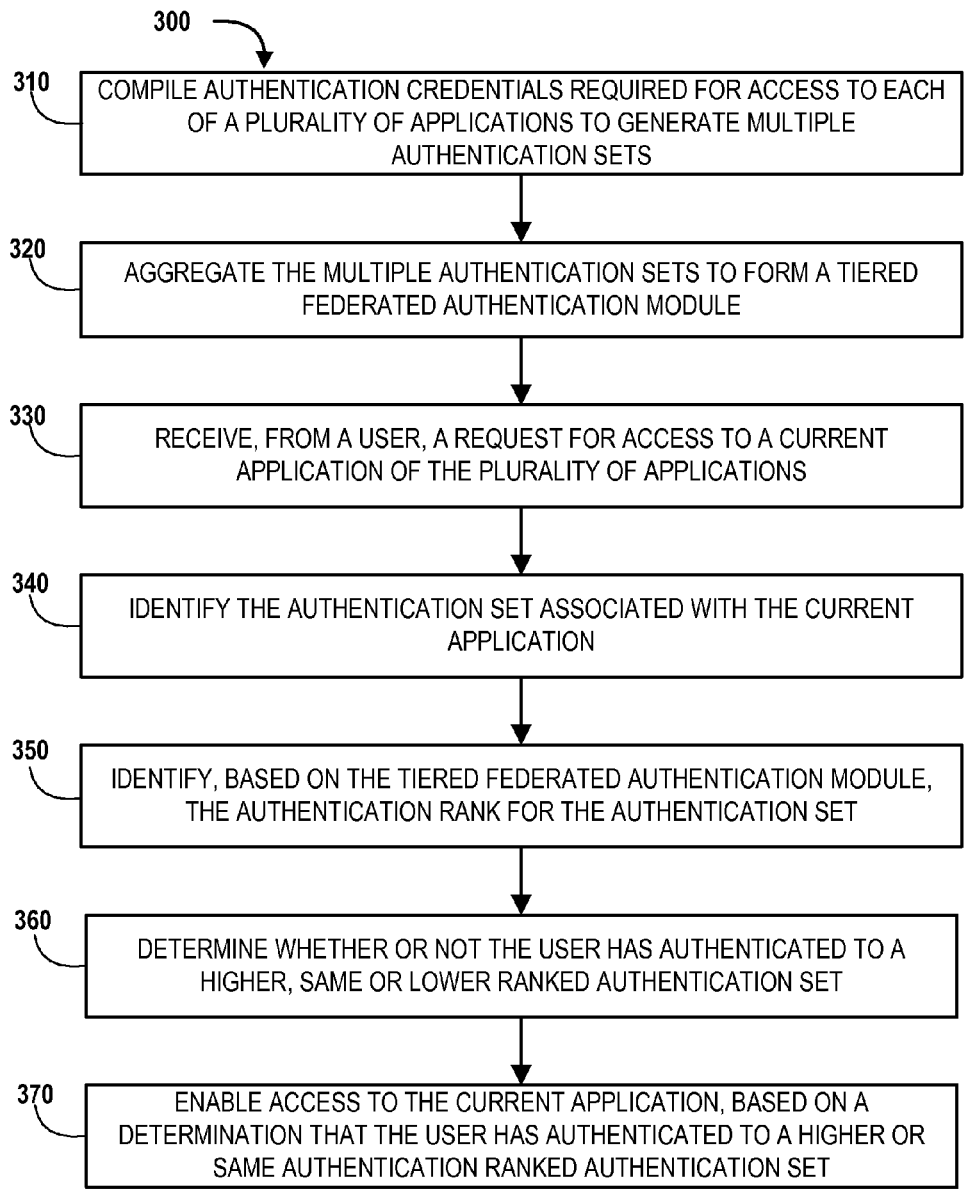
Figure 4:
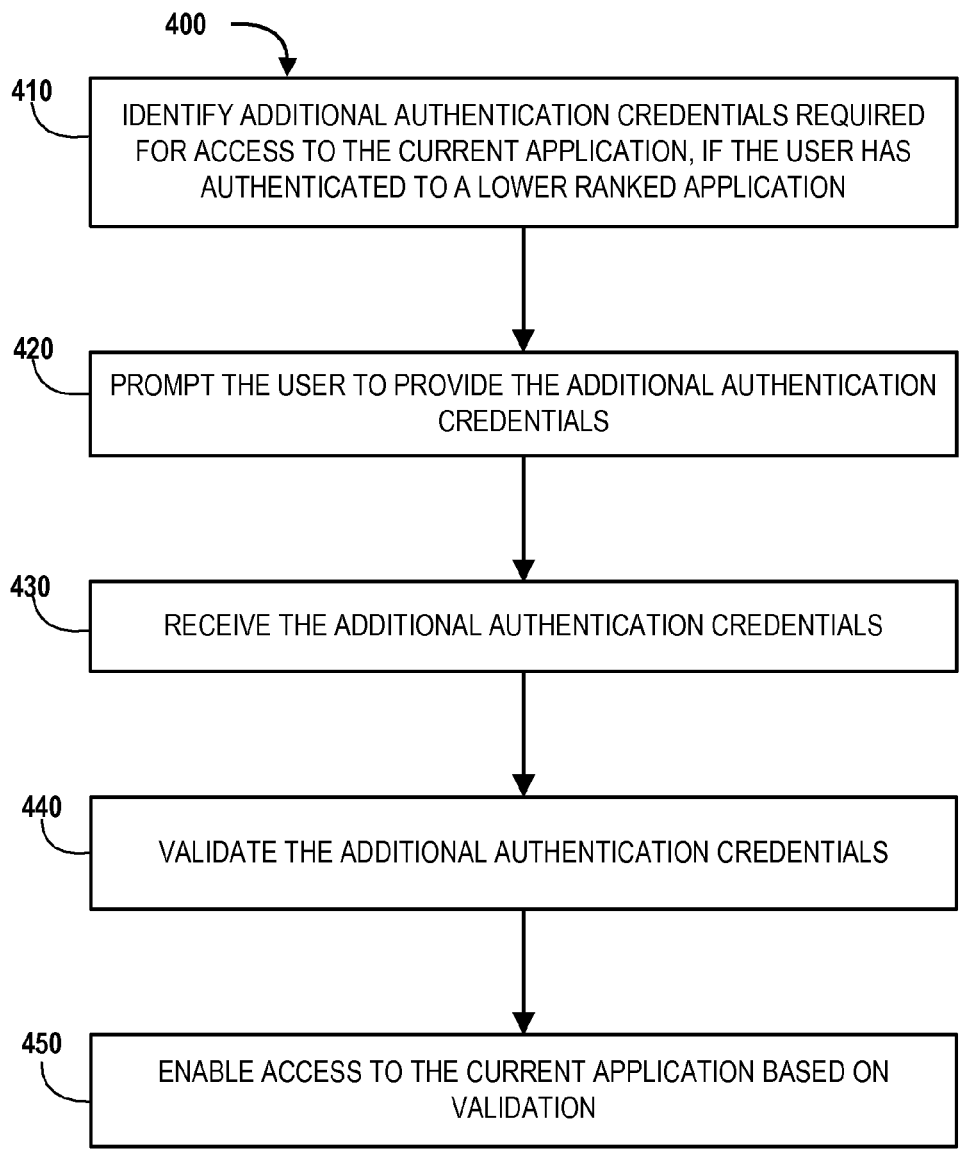

Having thus described embodiments of the invention in general terms, reference may now be made to the accompanying drawings:

FIG. 1 is a block diagram illustrating a system environment including a system for tiered identification federated authentication, in accordance with an embodiment of the invention;

FIG. 2 is a diagram illustrating a tiered federated authentication module continuum, in accordance with an embodiment of the present invention;

FIG. 3 is a flowchart illustrating a general process for tiered identification federated authentication, in accordance with an embodiment of the present invention; and FIG. 4 is a flowchart illustrating another general process for tiered identification federated authentication, in accordance with an embodiment of the present invention.

DETAILED DESCRIPTION OF EMBODIMENTS OF THE INVENTION

Embodiments of the present invention will now be described with respect to FIGS. 1-4. In view of this description, modifications and alterations to these embodiments or implementations will be apparent to one of ordinary skill in the art.

In the drawings, like reference characters and numbers refer to like elements throughout. Also, the drawings are not necessarily to scale, emphasis instead generally being placed upon illustrating the principles of the invention.

As may be appreciated by one of skill in the art, the present invention may be embodied as a system, computer-implemented method, computer program product, or a combination of the foregoing. Accordingly, the present invention may take the form of an entirely software embodiment (including firmware, resident software, micro-code, and the like.) or an embodiment combining software and hardware aspects that may generally be referred to herein as a "system." Furthermore, embodiments of the present invention may take the form of a computer program product on a non-transitory computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a RAM, a read-only memory (ROM), an erasable programmable read-only memory (EPROM or Flash memory), a compact disc read-only memory (CD-ROM), or other optical or magnetic storage device; or transmission media such as those supporting the Internet, an intranet, or a wireless network. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

The present disclosure provides systems and methods for tiered identification federated authentication. In particular, the systems and methods herein disclosed authenticate a user's access to one or more applications using previously validated authentication credentials.

Referring now to FIG. 1, a block diagram of a system environment 100 is provided, which includes a federated authentication system 110 administrated by an entity, a user computer system 120 owned by a user 130, third-party systems 140, and a network 150. The federated authentication system 110, the user computer system 120 and third-party systems 140 communicate with one another over the network 150.

A "system environment," as used herein, may refer to any information technology platform of an enterprise (e.g., a national or multi-national corporation), and may include a multitude of servers, machines, mainframes, personal computers, network devices, front and back end systems, database systems and/or the like.

As used herein, an "entity" may be any business, organization, or individual that owns, operates, or is otherwise associated with a federated authentication system 110. Although some embodiments of the invention described herein are generally described as involving an "entity," other embodiments of the invention may involve business institutions that take the place of or work in conjunction with the entity.

As used herein, the terms "customer" and "user" are interchangeable, both referring to a person who is affiliated with an entity herein defined. A "third party," as used herein, refers to any business or non-business units, outside the boundary of the entity, which provides services, applications and functions to users, such as websites, social networking media, email servers and the like.

As shown in FIG. 1, the federated authentication system 110 includes a communication interface 112, at least one processor 114, and a memory 116. The memory 116 includes software module 117 including one or more federated authentication applications 118 and a database 119. The communication interface 112 may encompass one more network interface cards, ports for connection of network devices, Universal Serial Bus (USB) connectors and the like.

The processor 114 is operatively coupled to the memory 116 and configured to execute the software module 117. The processor 114 may include a digital signal processor device, a microprocessor device, analog-to-digital converters, digital-to-analog converters, and other support circuits. Control and signal processing functions of the processor 114 may be allocated between these devices according to their respective capabilities. The processor 114 may also include functionality to operate other software programs based on computer executable code thereof, which may be stored, along with the federated authentication applications 118, on the federated authentication system 110.

The memory 116 may include volatile memory, such as random access memory (RAM) having a cache area for the temporary storage of information. The memory 116 may also include non-volatile memory that may be embedded and/or removable. The non-volatile memory may additionally or alternatively include an Electrically Erasable Programmable Read-Only Memory (EEPROM), flash memory, and/or the like.

The software module 117 contains computer readable code executable by the processor 114 and includes the one or more federated authentication applications 118. The federated authentication applications 118 may perform one or more of the steps and/or sub-steps discussed herein, including the steps associated with the tiered federated authentication module, and/or one or more steps not discussed herein.

It will be understood that the federated authentication system 110 may be configured to implement various user interfaces, applications and/or process flow described herein. It will also be understood that, in some embodiments, the memory 116 includes other applications. It will also be understood that, in some embodiments, the federated authentication system 110 may be configured to communicate with the third-party systems 140, for example, for purpose of identifying the user computer system 120 and/or obtaining information relating to the user 130.

The database 119 may archive information of customers affiliated with the entity, such as authentication credentials for access to a plurality of applications provided or associated with the entity. The database 119 may also store data/results related to the federated authentication applications 118.

The user computer system 120, as shown in FIG. 1, includes a communication interface 122, a processor 124 and a memory 126. The memory 126 includes a software module 127 that includes one or more user computer system applications 128, and a database 129. The user computer system 120 may, by way of example, include a personal digital assistant, a personal computer, a mobile device, an electronic notebook, or the like. While the user computer system 120 is shown as a single system in FIG. 1, it should be noted that multiple computer systems can make up the user computer system 120, with multiple devices and device types. For example, a user computer system may comprise one or more laptop computers, smart phones, wearable devices, desktop computers, and the like that are associated with the user 130.

In some embodiments, the one or more user computer system applications 128 are provided by or associated with the entity and include functionality features that allow the user 130 to interact with the entity or the goods and/or services of the entity.

In some embodiments, the user computer system applications 128 are provided by third parties through which user data may be accessed or intercepted. The user computer system applications 128 may include third-party applications, services and websites, web browser applications, social networking media, email servers and the like. In embodiments where multiple computer devices make up the user computer system 120, then the user computer system applications 128 may be applications that are on one or more of the computer devices. For example, a laptop computer device of the user 130 may comprise a first, a second, and a third application, and a mobile device of the user 130 may comprise the third, a fourth, and a fifth application. All five of these applications may be considered the user computer system applications 128 because these applications are on one or more of the computer devices associated with the user 130, and therefore the user computer system 120.

The third-party systems 140 can be any computerized apparatus controlled or operated by third parties other than the entity. In some embodiments, the third-party systems 140 include any system that hosts some functions, services or applications that are installed on the user computer system 120, or that are accessed or used by the user 130 via the user computer system 120. In some embodiments, the third-party systems 140 may also provide tools or information to the entity for generating certain functionality features for the federated authentication system 110.

The federated authentication system 110, the user computer system 120 and the third-party systems 140 are each operatively connected to the network 150 and in communication with one another. The network 150 may include various networking interfaces, such as a LAN, a WAN, a global area network (e.g., Internet), or a hybrid thereof In some embodiments, the federated authentication system 110 compiles one or more authentication credentials required for access to each of the user computer system applications 128 to generate an authentication set for each of the applications, thereby generating a plurality of authentication sets for all of the user computer system applications 128, wherein more than one application may share a same authentication set. In some embodiments, the federated authentication system 110 aggregates the plurality of authentication sets to form a tiered federated authentication module, as illustrated in FIG. 2, wherein each rank is associated with one of the authentication sets and thereby associated with at least one of the applications, and wherein a higher ranked authentication set or application corresponds to more stringent authentication credentials and a lower ranked authentication set or application corresponds to less stringent authentication credentials.

In some embodiments, the authentication credentials include one or more of user identity information such as a username, a password, a passcode, a PIN, security questions, biometric data, device information associated with a mobile device of the user, the user account information, or any combination thereof.

In some embodiments, the federated authentication system 110, after receiving a request from the user 130 for access to an application (herein called "current application"), identifies the rank of the current application, using the tiered federated authentication module. The federated authentication system 110 then determines whether or not the user 130 has previously authenticated to another application, and, if so, the federated authentication system 110 determines the rank of the previously authenticated application. If it is determined that the previously authenticated application has a rank higher than the current application, the federated authentication system 110 enables access to the current application, without requiring the user 130 to authenticate again.

In some embodiments, if it is determined that the user 130 has previously authenticated to a lower ranked application, the federated authentication system 110 then identifies, based on the federated authentication, additional authentication credentials required for access to the current application, wherein the additional authentication credentials is the difference between two authentication sets associated with the current and the previously authenticated lower ranked application. The federated authentication system 110 then prompts the user to provide the additional authentication credentials. After receiving the additional authentication credentials from the user 130, the federated authentication system 110 validates the additional authentication credentials and enables the user's access to the current application, based on validation.

In some embodiments, if it is determined that the user 130 has not previously authenticated to any application, the federated authentication system 110 identifies, based on the federated authentication, authentication credentials required for access to the current application and prompts the user 130 to provide the required authentication credentials. After receiving the authentication credentials from the user 130, the federated authentication system 110 validates the authentication credentials and enables the user's access to the current application, based on validation.

In some embodiments, after the user 130 has authenticated to an application, the federated authentication system 110 generates a security token and passes the token to the user 130. In some embodiments, the security token enables access to one or more applications of the plurality of applications.

In some embodiments, authentication for an application remains valid for a period of time defined by the federated authentication system 110, and, in such embodiments, the federated authentication system 110 may notify the user 130 when the authentication has expired.

Referring now to FIG. 2, a federated authentication continuum 200 is shown as having multiple authentication rankings, where each authentication rank is associated with an authentication set including one or more authentication credentials required for access to one or more applications. Therefore, each authentication rank is associated with at least one of a plurality of applications. As shown in FIG. 2, the most left-hand side of the continuum 200 corresponds to a "lowest ranked authentication set," and the most right-hand side of the continuum 200 corresponds to a "highest ranked authentication set." In between the two extremes, inclusive, there are multiple authentication rankings, from 1 to N, and an arrow indicates an increase in authentication ranking A higher authentication ranked authentication set corresponds to more stringent authentication credentials and a lower authentication ranked authentication set corresponds to less stringent authentication credentials. For example, a first authentication rank may comprise a first authentication set of multiple applications that require a specific user name and password as the authentication credentials. A second authentication rank may comprise a second authentication set of multiple applications that require the same specific user name and password as well as a security question as the authentication credentials. In this example, the second authentication set has a higher authentication ranking than the first authentication set because the second authentication set includes applications with a more stringent set of authentication credentials.

In another example, a first authentication set may comprise multiple applications that require a 6-digit passcode. Additionally, a second authentication set may comprise multiple applications that require a 12-digit passcode. In this example, the second authentication set has a higher authentication ranking than the first authentication set because the second authentication set has a more stringent passcode requirement than the first authentication set.

In another example, a first authentication set may comprise multiple applications that require a user name and password for authorization. Additionally, a second authentication set may comprise one or more applications that require a biometric scan for authorization, with no user name or password required. In such an embodiment, the second authentication set has a higher authentication ranking than the first authentication set because the second authentication set has a more stringent type of authorization process than the first authentication set.

In some embodiments, two or more authentication sets may have authentication ranks that are equivalent. For example, a first authentication set may comprise one or more applications that require a user name and password for authorization. Additionally, a second authentication set may comprise one or more applications that require a different user name and password combination for authorization, however the user names and passwords for both the first and second authentication sets have substantially similar requirements such that the two authentication rankings are considered equivalent by the system. In such an embodiment, the system may deem a user's authorization credentials, as applied to an application in the first authentication set is enough to authenticate the user for applications in the second authentication set.

FIG. 3 illustrates a general process flow 300 for tiered identification federated authentication, in accordance with an embodiment of the present invention. The process 300 can be executed by the federated authentication system 110 in the system environment 100, as shown in FIG. 1.

The process 300 may include multiple steps, executable by a processor controlled by a federated authentication system. The process 300 may begin with Block 310, where the system compiles one or more authentication credentials required for access to each of a plurality of applications to generate an authentication set for each of the applications. Each authentication set comprises one or more applications associated with one or more user devices that require either the same authorization credentials or substantially similar authorization credentials. For example, if two applications require the same username and password authentication credentials, then the two applications should be classified in the same authentication set. In one embodiment, if a third application requires a username and password authentication credential that follows the same requirements as the username and password requirements of the first and second applications, then the third application can be included in the same application set as the first and second applications, even if the third application does not use the exact same username and password combination. Therefore, each authentication set can be considered to have its own authentication level, based on the authentication criteria and authentication criteria requirements of its constituent applications.

The authentication criteria used herein may comprise, but is not limited to, user identity information such as a username, a password, a passcode, a PIN, security or secret questions, biometric data, device information, account information, or any combination thereof In some embodiments, the plurality of applications may include one or more financial applications provided by the entity and downloaded to a user computer system such as a personal computer, a mobile device, a tablet or the like. A financial application is typically built with functionality features that allow a user to act on his/her financial accounts, for example, transferring funds between the accounts, executing account withdrawals or deposits, processing commercial payments related to online bill-pay or peer-to-peer payments, and the like. The financial accounts may include one or more deposit accounts, debit accounts, savings accounts, checking accounts, investment accounts, money market accounts, credit accounts, or any combination thereof. In some embodiments, the plurality of applications may also include one or more non-financial applications provided by third parties through which the financial applications or user financial accounts/information may be accessed. A non-financial application may be a third-party service, application or website, a web browser application, a social-networking medium, an email server or the like.

In some embodiments, the system stores the authentication sets in an authentication set database. The authentication set database may be stored in the memory of the federated authentication system, the user computer system, or a third party system such that the federated authentication system can access the authentication set database via the network.

Once the plurality of authentication sets are generated, the process 300 may progress to Block 320, where the system aggregates the multiple authentication sets to form a tiered federated authentication module having multiple authentication rankings, wherein each authentication rank is associated with one of the authentication sets, and wherein a higher ranked authentication set or application corresponds to more stringent authentication credentials and a lower ranked authentication set or application corresponds to less stringent authentication credentials. A higher authentication ranked authentication set corresponds to more stringent authentication credentials and a lower authentication ranked authentication set corresponds to less stringent authentication credentials. For example, a first authentication rank may comprise a first authentication set of multiple applications that require a specific user name and password as the authentication credentials. A second authentication rank may comprise a second authentication set of multiple applications that require the same specific user name and password as well as a security question as the authentication credentials. In this example, the second authentication set has a higher authentication ranking than the first authentication set because the second authentication set includes applications with a more stringent set of authentication credentials.

In one embodiment, the application sets can be aggregated and compared by authentication rank based on the federated authentication continuum 200 shown in FIG. 2. As discussed with regard to FIG. 2, authentication sets with more stringent or complex authentication criteria are considered to have a higher authentication ranking than authentication sets with a lower degree of complexity or difficultness in their authentication criteria. In some embodiments, the authentication rank is a number or letter that represents the authentication rank for the authentication set, relative to the other authentication sets on the continuum. In some embodiments, the authentication rank is a factor of the complexity of the authentication criteria for the applications in the authentication set.

The system may compile, document, and store information related to the authentication rankings of each authentication set in an authentication rank database on the user computer system, the federated authentication system, and/or a third-party system, such that the federated authentication system may access the database via the network.

In some embodiments of the system, the authentication ranking is adjustable based on one or more additional factors to the authentication credentials. For example, the system may lower an authentication ranking of an authentication set if the system determines that the user is in an expected or safe location such as the user's home, work, or the entity's place of business. Additionally, the system may increase an authentication ranking of an authentication set if the system determines that the user is accessing a certain application at an uncommon time of day. A set of non-limiting examples of additional factors that can affect authentication credentials includes the geographic location of the user, the position or orientation of a mobile device during authentication, time of day, day of the year, the user's frequency of accessing a certain application, and the like. As such, the system may monitor geographic location information of a mobile device associated with the user, accelerometer information associated with a mobile device, common user interactions with the one or more user computer system devices, and the like.

Upon formation of the tiered federated authentication module, the process 300 may move to Block 330, where the system receives a request from a user for access to one of the applications (herein called "current application"). The current application may be one of the plurality of applications associated with the mobile device. In some embodiments, the system has established a secure electronic communication channel between the federated authentication system and the user computer system, whereby information may be securely communicated between the two systems. In such an embodiment, the user may send a request to the system for gaining access to the current application via the secure electronic communication channel. The system may then receive the notification via the communication channel.

After receiving the user request, the process 300 may move to Block 340, where the system identifies the authentication set associated with the current application. In one embodiment, the system may access the authentication set database to match the current application with its associated authentication set. As described above, each authentication set comprises one or more applications that require the same, or at least substantially similar, authentication credentials.

Additionally, each authentication set has an authentication ranking that puts the authentication set on the tiered federated authentication module continuum, allowing the system to compare the authentication set to other authentication sets in the system. This allows the system, in some embodiments, to perform Block 350 of the process 300, where the system identifies the rank of the current application, using the tiered federated authentication module. In some embodiments, the system accesses the authentication rank database to match an authentication rank from the tiered federated authentication module continuum to the authentication set.

Once the system has identified the authentication set for the current application and the authentication rank of the authentication set, the system may inspect the remaining applications on the one or more user devices to determine whether or not the user is already authenticated to an application set with an application rank that is higher, lower, or equal to the application set of the current application, as shown in Block 360. The system may, for each of the remaining applications, determine the authentication rankings for the other applications in a similar manner as the embodiments described in Blocks 340 and 350.

The remaining applications on the one or more user devices may be applications that are related to the current application. For example, a remaining application and the current application may have been created by the same entity, by separate business groups within the same entity, by related entities, and the like. In this manner, the system is able to transfer the user from one application to another application using the federated authentication tier module system.

In some embodiments, the remaining applications on the one or more user devices may be applications that are not related to the current application. As such, a remaining application and the current application may have been created by separate and unrelated entities, be directed to unrelated application functions, and the like. For example, the current application may be a financial application and one or more of the remaining applications may be social media applications. In this way, the system is able to grant access to the user for a diverse set of unrelated applications on the user's computing device systems.

In some embodiments, the system will initially gain approval or permission from the owners or operators of the one or more applications associated with the user's device such that the system is authorized to log the user into and/or out of each of the one or more applications. In some embodiments, by gaining permission or authorization to log a user into an application that is not owned or operated by the entity comprises gaining permission or authorization to use an authentication and validation system owned by the entity instead of the authentication and validation system of the application. As such, the system may not be required to log the user into an application through that application's authentication and validation system as long as the system uses the authentication and validation system owned by the entity.

If the system determines that at least one of the other applications has an application set with either a higher or an equal authentication rank as the current application, then the system may enable access to the present application for the user without requiring any authentication credentials, as described in Block 370. The system may enable access to the current application because the user is already authorized to access at least one an application that has authentication requirements that are at least as stringent as the current application.

If it is determined that the user has previously authenticated to a lower ranked application, then the user request is processed by a process 400, as illustrated in FIG. 4. Referring now to FIG. 4, the system may execute a process 400, which, again, can be executed by the processor 114 of the federated authentication system 110 of FIG. 1. As shown in FIG. 4, the process 400 may continue from the process 300 described in FIG. 3 with Block 410 to determine that the user is authenticated only to an application set with a lower authentication rank than the current application's application set. The system may then identify additional authentication credentials required for access to the current application, using the federated authentication module. In some embodiments, the additional authentication credentials are identified by determining the difference between two authentication sets associated with the current application and the previously authenticated lower ranked application.

For example, the authentication set for the current application may require authentication credentials of a username and password along with a scanned thumb print from the user. Additionally, the authentication set with the lower authentication rank may require authentication credentials of just the username and password. In such an example, the additional authentication credentials comprise the scanned thumb print from the user, as this was the only authentication credential that is not already authenticated on the system. Since the system has already authenticated the username and password from the lower ranked authentication set, the system does not need to request this information from the user to grant access to the current application. Instead, the system only needs the scan of the user's thumb print, the additional authentication criteria, to authenticate the user and grant access to the current application.

Therefore, once the additional authentication credentials are identified, the process 400 may move to Block 420 to prompt the user to provide the additional authentication credentials. The system may communicate with the user via the secure electronic communication channel established by the system to prompt the user to prompt the user to present the additional authentication credentials.

After prompting the user for the additional authentication credentials, the process 400 may move to Block 430, where the system receives, from the user, the additional authentication credentials. Again, the user may transmit the additional authentication credentials via the secure electronic communication channel established by the system to protect the user's information during the process 400. Upon receipt of the additional authentication credentials, the process 400 may progress to Block 440, where the system validates the additional authentication credentials. In some embodiments, the system may match the user's additional authentication credentials to the authentication credentials stored in the compiled authentication credentials database. If the authentication credentials match, then the system may validate the user as authorized to access the current application.

Based on validation, the process 400 advances to Block 450 to enable the user's access to the current application. The system is able to authenticate the user with only part of the normal authentication credentials because the remaining portion of the authentication credentials have already been processed by the system or the user's computer device upon the authorization of the user for the lower-tiered authentication credentialed application. The system is able to combine the lower-tiered authentication credentials with the newly received additional authentication credentials of the user to generate a complete user authentication process for gaining access to the current application.

In some embodiments, each of the processes 300 and 400, after authenticating an application, generates a security token and passes the token to the user. In some embodiments, the security token enables the user to access to one or more applications belonging to authentication sets with equivalent or lower authentication rankings to the current application. In some embodiments, the system may, upon authenticating the user for the current application, automatically authenticate the user for all applications that require equivalent or less stringent authorization credentials. This may be accomplished by authenticating the user for each lower-tiered application or by generating the security token for the applications with lower-tiered (and equivalent) authorization credentials.

In some embodiments, authentication for an application remains valid for a predefined period of time and, in such embodiments, each of the processes 300 and 400 may further include notifying the user when the authentication has expired.

Although a number of implementations have been described in detail above, other modifications, variations and implementations are possible in light of the foregoing teaching. The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. As used herein, all numbers may be read as if prefaced by the term "about," even if the term does not expressly appear. Also, any numerical range recited herein is intended to include all sub-ranges subsumed therein. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. Thus, although not expressly described, any or each of the features of the invention disclosed herein may be combined in any manner.

Accordingly, the invention is to be defined not by the preceding illustrative description but instead by the scope of the following claims.

INCORPORATION BY REFERENCE

To supplement the present disclosure, this application further incorporates entirely by reference the following commonly assigned patent applications:

| U.S. patent application Ser. No. | Title | Filed On |
|---|---|---|
| To be assigned | DETERMINING USER AUTHENTICATION BASED ON USER/DEVICE INTERACTION | Concurrently herewith |
| To be assigned | DETERMINING USER AUTHENTICATION BASED ON USER PATTERNS WITHIN APPLICATION | Concurrently herewith |
| To be assigned | PASSIVE BASED SECURITY ESCALATION TO SHUT OFF OF APPLICATION BASED ON RULES EVENT TRIGGERING | Concurrently herewith |
| To be assigned | PERMANENTLY AFFIXED UN-DECRYPTABLE IDENTIFIER ASSOCIATED WITH MOBILE DEVICE | Concurrently herewith |
| To be assigned | INTEGRATED FULL AND PARTIAL SHUTDOWN APPLICATION PROGRAMMING INTERFACE | Concurrently herewith |

What is claimed is:

1. A system for tiered identification federated authentication, the system comprising:
    a computer apparatus comprising at least one processor and a memory; and
    a software module, stored in the memory, comprising computer readable code executable by the processor, and configured to:
        compile one or more authentication credentials required for access to each of a plurality of applications to generate an authentication set for each of the plurality applications, thereby generating a plurality of authentication sets for the plurality of applications, wherein more than one application may share a same authentication set;
        store the plurality of authentication sets in an authentication set database;
        aggregate the plurality of authentication sets to form a tiered federated authentication module having multiple authentication rankings, wherein each authentication ranking is associated with one of the authentication sets, and wherein authentication sets with a higher authentication ranking corresponds to more stringent authentication credentials and a lower ranked authentication set or application corresponds to less stringent authentication credentials;

receive, from a user, a request for access to a first application, wherein the first application is one of the plurality of applications;

identify, based on the authentication set database, a first authentication set associated with the first application;

identify, based on the tiered federated authentication module, a first authentication rank associated with the first authentication set;

determine that the user is currently authenticated to a second application;

identify, based on the authentication set database, a second authentication set associated with the second application;

identify, based on the tiered federated authentication module, a second authentication rank associated with the second authentication set; and enable access to the first application for the user based on a comparison of the first authentication rank and the second authentication rank.

2. The system of claim 1, wherein the software module is further configured to:

determine that the second authentication rank is higher than or equivalent to the first authentication rank; and enable access to the first application for the user without requiring the user to provide authentication credentials for the first application.

3. The system of claim 2, wherein the software module is further configured to:

determine that the user is currently not authenticated to a third application;

identify, based on the authentication set database, a third authentication set associated with the third application;

identify, based on the tiered federated authentication module, a third authentication rank associated with the third authentication set;

determine that the third authentication rank is lower than or equivalent to the first authentication rank; and automatically enable access to the third application for the user.

4. The system of claim 1, wherein the software module is further configured to:

determine that the second authentication rank is lower than the first authentication rank;

identify, based on the tiered federated authentication module, additional authentication credentials required for access to the first authentication rank, wherein the additional authentication credentials comprise fewer authentication credentials than original authentication credentials for the first authentication rank and more authentication credentials than original authentication credentials for the second authentication rank;

prompt the user to provide the additional authentication credentials for the first authentication rank;

receive, from the user, the additional authentication credentials for the first authentication rank;

validate the additional authentication credentials for the first authentication rank; and enable access to the first application, based on validating the additional authentication credentials.

5. The system of claim 1, wherein enabling comprises generating a security token and providing the token to the user, wherein the security token enables access to one or more applications of the plurality of applications.

6. The system of claim 1, wherein the authentication credentials comprises one or more of a username, a password, a passcode, a personal identification number (PIN), security questions, biometric data, device information associated with a mobile device of the user, user account information, or any combination thereof.

7. A computer-implemented method for tiered identification federated authentication, the method comprising:

compiling one or more authentication credentials required for access to each of a plurality of applications to generate an authentication set for each of the plurality applications, thereby generating a plurality of authentication sets for the plurality of applications, wherein more than one application may share a same authentication set;

storing the plurality of authentication sets in an authentication set database;

aggregating the plurality of authentication sets to form a tiered federated authentication module having multiple authentication rankings, wherein each authentication ranking is associated with one of the authentication sets, and wherein authentication sets with a higher authentication ranking corresponds to more stringent authentication credentials and a lower ranked authentication set or application corresponds to less stringent authentication credentials;

receiving, from a user, a request for access to a first application, wherein the first application is one of the plurality of applications;

identifying, based on the authentication set database, a first authentication set associated with the first application;

identifying, based on the tiered federated authentication module, a first authentication rank associated with the first authentication set;

determining that the user is currently authenticated to a second application;

identifying, based on the authentication set database, a second authentication set associated with the second application;

identifying, based on the tiered federated authentication module, a second authentication rank associated with the second authentication set; and determining whether or not the user has authenticated to an application and the rank of the application; and enabling access to the first application for the user based on a comparison of the first authentication rank and the second authentication rank.

8. The method of claim 7, further comprising:

determining that the second authentication rank is higher than or equivalent to the first authentication rank; and enabling access to the first application for the user without requiring the user to provide authentication credentials for the first application.

9. The method of claim 8, further comprising:

determining that the user is currently not authenticated to a third application;

identifying, based on the authentication set database, a third authentication set associated with the third application;

identifying, based on the tiered federated authentication module, a third authentication rank associated with the third authentication set;

determining that the third authentication rank is lower than or equivalent to the first authentication rank; and automatically enabling access to the third application for the user.

10. The method of claim 7, further comprising:

determining that the second authentication rank is lower than the first authentication rank;

identifying, based on the tiered federated authentication module, additional authentication credentials required for access to the first authentication rank, wherein the additional authentication credentials comprise fewer authentication credentials than original authentication credentials for the first authentication rank and more authentication credentials than original authentication credentials for the second authentication rank;

prompting the user to provide the additional authentication credentials for the first authentication rank;

receiving, from the user, the additional authentication credentials for the first authentication rank;

validating the additional authentication credentials for the first authentication rank; and enabling access to the first application, based on validating the additional authentication credentials.

11. The method of claim 7, wherein enabling comprises generating a security token and providing the token to the user, wherein the security token enables access to one or more applications of the plurality of applications.

12. The method of claim 7, wherein the authentication credentials comprises one or more of a username, a password, a passcode, a personal identification number (PIN), security questions, biometric data, device information associated with a mobile device of the user, user account information, or any combination thereof.

13. A computer program product for tiered identification federated authentication, the computer program product comprising a non-transitory computer readable medium having one or more computer-readable programs stored therein, and the computer readable programs, when executed by a computer apparatus, cause the computer apparatus to perform the following steps:

compiling, via a computing device processor, one or more authentication credentials required for access to each of a plurality of applications to generate an authentication set for each of the plurality applications, thereby generating a plurality of authentication sets for the plurality of applications, wherein more than one application may share a same authentication set;

storing, via a computing device processor, the plurality of authentication sets in an authentication set database;

aggregating, via a computing device processor, the plurality of authentication sets to form a tiered federated authentication module having multiple authentication rankings, wherein each authentication ranking is associated with one of the authentication sets, and wherein authentication sets with a higher authentication ranking corresponds to more stringent authentication credentials and a lower ranked authentication set or application corresponds to less stringent authentication credentials;

receiving, via a computing device processor, from a user, a request for access to a first application, wherein the first application is one of the plurality of applications;

identifying, via a computing device processor, based on the authentication set database, a first authentication set associated with the first application;

identifying, via a computing device processor, based on the tiered federated authentication module, a first authentication rank associated with the first authentication set;

determining, via a computing device processor, that the user is currently authenticated to a second application;

identifying, via a computing device processor, based on the authentication set database, a second authentication set associated with the second application;

identifying, via a computing device processor, based on the tiered federated authentication module, a second authentication rank associated with the second authentication set; and determining, via a computing device processor, whether or not the user has authenticated to an application and the rank of the application; and enabling access, via a computing device processor, to the first application for the user based on a comparison of the first authentication rank and the second authentication rank.

14. The computer program product of claim 13 further comprising computer readable programs, when executed by a computer apparatus, cause the computer apparatus to perform the following steps:

determining, via a computing device processor, that the second authentication rank is higher than or equivalent to the first authentication rank; and enabling, via a computing device processor, access to the first application for the user without requiring the user to provide authentication credentials for the first application.

15. The computer program product of claim 14 further comprising computer readable programs, when executed by a computer apparatus, cause the computer apparatus to perform the following steps:

determining, via a computing device processor, that the user is currently not authenticated to a third application;

identifying, via a computing device processor, based on the authentication set database, a third authentication set associated with the third application;

identifying, via a computing device processor, based on the tiered federated authentication module, a third authentication rank associated with the third authentication set;

determining, via a computing device processor, that the third authentication rank is lower than or equivalent to the first authentication rank; and automatically enabling, via a computing device processor, access to the third application for the user.

16. The computer program product of claim 13, further comprising computer readable programs, when executed by a computer apparatus, cause the computer apparatus to perform the following steps:

determining, via a computing device processor, that the second authentication rank is lower than the first authentication rank;

identifying, via a computing device processor, based on the tiered federated authentication module, additional authentication credentials required for access to the first authentication rank, wherein the additional authentication credentials comprise fewer authentication credentials than original authentication credentials for the first authentication rank and more authentication credentials than original authentication credentials for the second authentication rank;

prompting, via a computing device processor, the user to provide the additional authentication credentials for the first authentication rank;

receiving, via a computing device processor, from the user, the additional authentication credentials for the first authentication rank;

validating, via a computing device processor, the additional authentication credentials for the first authentication rank; and enabling access, via a computing device processor, to the first application, based on validating the additional authentication credentials.

17. The computer program product of claim 13, wherein enabling comprises generating a security token and providing the token to the user, wherein the security token enables access to one or more applications of the plurality of applications.

18. The computer program product of claim 13, wherein the authentication credentials comprises one or more of a username, a password, a passcode, a personal identification number (PIN), security questions, biometric data, device information associated with a mobile device of the user, user account information, or any combination thereof.

* * * * *